(12) United States Patent
Chen

(10) Patent No.: US 10,009,061 B2
(45) Date of Patent: Jun. 26, 2018

(54) TERMINAL AND METHOD FOR IMPROVING TERMINAL RECEPTION SENSITIVITY

(71) Applicant: Hytera Communications Corp., Ltd., Shenzhen, Guangdong (CN)

(72) Inventor: Lingwei Chen, Guangdong (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 112 days.

(21) Appl. No.: 14/902,297

(22) PCT Filed: Jul. 3, 2013

(86) PCT No.: PCT/CN2013/078748
§ 371 (c)(1),
(2) Date: Dec. 30, 2015

(87) PCT Pub. No.: WO2015/000147
PCT Pub. Date: Jan. 8, 2015

(65) Prior Publication Data
US 2016/0204825 A1    Jul. 14, 2016

(51) Int. Cl.
*H04B 1/54* (2006.01)
*H04B 1/40* (2015.01)
(Continued)

(52) U.S. Cl.
CPC ............. *H04B 1/54* (2013.01); *H04B 1/40* (2013.01); *H04B 1/525* (2013.01); *H04B 15/06* (2013.01)

(58) Field of Classification Search
CPC ................. H04B 1/54; H04B 1/40–1/588
(Continued)

(56) References Cited

U.S. PATENT DOCUMENTS 5,598,405 A * 1/1997 Hirose .................. H03L 7/099
327/156
2006/0234649 A1    10/2006 Okada
(Continued)

FOREIGN PATENT DOCUMENTS

CN        1659793 A    8/2005
CN      101009497 A    8/2007
(Continued)

OTHER PUBLICATIONS

Chinese Office Action, dated Dec. 12, 2014, from related Chinese Patent Application No. 201310277491.X.
(Continued)

*Primary Examiner* — Pao Sinkantarakorn
(74) *Attorney, Agent, or Firm* — Wolf, Greenfield & Sacks, P.C.

(57) ABSTRACT

A terminal and method for improving the terminal reception sensitivity; when the terminal works in a time division duplexing mode, the method comprises: in a transmitting time slot, using the frequency of the transmitting voltage control oscillator (VCO) of the terminal as a first frequency; and in a receiving time slot, using the frequency of the transmitting VCO of the terminal as a preset second frequency, the predetermined second frequency differs from the first frequency in the bandwidth of at least one channel. The present invention improves the reception sensitivity of a terminal, reduces the production cost of the terminal, and decreases product size.

6 Claims, 1 Drawing Sheet

(51) Int. Cl.
*H04B 1/525* (2015.01)
*H04B 15/06* (2006.01)

(58) Field of Classification Search
USPC .................................................. 370/310–350
See application file for complete search history.

(56) References Cited

U.S. PATENT DOCUMENTS

2007/0155342 A1     7/2007   Tsai et al.
2011/0064405 A1*    3/2011   Rajagopal ............ H04B 10/114
                                                       398/43

FOREIGN PATENT DOCUMENTS

| | | |
|---|---|---|
| CN | 101106390 A | 1/2008 |
| CN | 101202556 A | 6/2008 |
| CN | 101355369 A | 1/2009 |
| CN | 101400094 A | 4/2009 |
| CN | 102457292 A | 5/2012 |
| CN | 103368602 A | 10/2013 |
| CN | 103107826 A | 5/2015 |
| EP | 0496498 A2 | 7/1992 |
| EP | 0618684 A | 10/1994 |
| EP | 2073394 A1 | 6/2009 |

OTHER PUBLICATIONS

Extended European Search Report, dated Dec. 12, 2014, from related European Patent Application No. 13888847.4.
International Search Report, dated Mar. 17, 2014, from corresponding International Application No. PCT/CN2013/078748.

\* cited by examiner

TERMINAL AND METHOD FOR IMPROVING TERMINAL RECEPTION SENSITIVITY

CROSS-REFERENCE TO THE RELATED APPLICATIONS

This application is the US national phase of International Application No. PCT/CN2013/078748, titled "TERMINAL AND METHOD FOR IMPROVING TERMINAL RECEPTION SENSITIVITY", filed on Jul. 3, 2013, which application is hereby incorporated by reference to the maximum extent allowable by law.

FIELD

The present application relates to the field of communication technology, and in particular to a method for improving receiving sensitivity of a terminal and a terminal.

BACKGROUND

In the field of digital mobile radio (DMR, Digital Mobile Radio), high receiving sensitivity is required for a receiver in a wireless communication system.

Time division duplex mode is also known as duplex mode with a same frequency. In a mobile communication system in the time division duplex mode, receiving and transmitting are performed in different timeslots of a same frequency channel, i.e., in different time slots of a carrier, so as to avoid mutual interference of a transmitter and a receiver.

In the case that a terminal operates in the time division duplex mode, since the transmitting frequency is the same as the receiving frequency, a VCO (Voltage Control Oscillator) in the transmitter is usually in the off-state in a receiving timeslot, to avoid the influence on the sensitivity of the receiver caused by the transmitter. The inventor finds in practice that, in some terminals, if transmitting VCO is turned off in the receiving timeslot, it may take 7 ms of locking time to start up the transmitting VCO in the transmitting timeslot. A requirement for the locking time in a terminal system is no greater than 2 ms, thus the transmitting VCO needs to be kept in operation in the receiving timeslot of the terminal, so as to reduce the locking time to less than 2 ms, which meets the requirement for the locking time in a terminal system. Since the transmitting VCO is not turned off in the receiving timeslot of the terminal, and the frequency for transmitting VCO is the same as the frequency for receiving VCO in the time division duplex mode, the output signal of transmitting VCO is prone to leaking to the receiving channel, and influences the receiving sensitivity in the time division duplex mode.

In conventional technology, to avoid signal leakage from the Transmitting VCO, a method for improving the receiving sensitivity in the time division duplex mode include: shielding the receiving channel from the transmitting channel, to improve the isolation between the receiving channel and the transmitting channel. However, it requires that the receiving channel is far away from the transmitting channel, and multiple disconnecting switches are introduced in the circuit, thereby causing high cost and a big size of a product.

SUMMARY

A method for improving receiving sensitivity of a terminal and a terminal are provided according to the embodiments of the disclosure, in order to improve the receiving sensitivity of the terminal.

In a first aspect, a method for improving receiving sensitivity of a terminal is provided. In the case that the terminal operates in a time division duplex mode, the method includes: setting a frequency of a transmitting voltage-controlled oscillator VCO of the terminal at a first frequency in a transmitting timeslot; and setting the frequency of the transmitting VCO of the terminal at a preset second frequency in a receiving timeslot, where the first frequency is higher or lower than the preset second frequency by at least one channel bandwidth.

In a first possible implementation, the method further includes:
setting a frequency of a receiving VCO of the terminal to be the first frequency in the receiving timeslot.

With combination of the first possible implementation in the first aspect, in a second possible implementation, the method further includes:
keeping, in the receiving timeslot, the transmitting VCO in operation, and turning off a transmitting power amplifier link.

In a second aspect, a terminal is provided. The terminal supports a time division duplex mode, and in the case that the terminal operates in the time division duplex mode, the terminal includes:
a first frequency control unit, configured to set a frequency of a transmitting VCO of the terminal to be a first frequency in a transmitting timeslot; and
a second frequency control unit, configured to set the frequency of the VCO of the terminal to be a preset second frequency in a receiving timeslot, where the first frequency is higher or lower than the preset second frequency by at least one channel bandwidth.

In a first possible implementation, the terminal further includes: a third frequency control unit, configured to set a frequency of a receiving VCO to be the first frequency in the receiving timeslot.

With combination of the first possible implementation in the second aspect, in a second possible implementation, the terminal further includes: an operation control unit, configured to keep, in the receiving timeslot, the transmitting VCO in operation, and turn off a transmitting power amplifier link.

With combination of the second aspect or the first possible implementation in the second aspect or the second possible implementation in the second aspect, in a third possible implementation, the terminal is a digital two-way radio.

Compared with the conventional technology, according to the embodiments of the disclosure, the frequency for transmitting VCO in the receiving timeslot is shifted to be higher or lower than the frequency for receiving VCO by at least one channel bandwidth in the case that the terminal operates in the time division duplex mode, so as to prevent signal leakage of the transmitting VCO from influencing the receiving sensitivity, improve the receiving sensitivity of the terminal, and reduce production cost of the terminal and a size of a product.

BRIEF DESCRIPTION OF THE DRAWINGS

The drawings to be used in the description of embodiments or the conventional technology are described briefly hereinafter, to make technical solutions according to the embodiments of the disclosure or conventional technology clearer. Apparently, the drawings in the following description only illustrate some embodiments of the disclosure. For those skilled in the art, other drawings may be obtained based on these drawings without any creative effort.

DETAILED DESCRIPTION

Hereinafter, the technical solutions according to the embodiments of the disclosure are described clearly and completely in conjunction with drawings. Apparently, the described embodiments are only a part of rather than all of the embodiments of the disclosure. All other embodiments obtained by those skilled in the art based on the embodiments of the disclosure without creative effort fall within the protection scope of the disclosure.

A method for improving receiving sensitivity of a terminal and a terminal are provided according to the embodiments of the disclosure, to improve the receiving sensitivity of the terminal. The following is description in detail.

A First Embodiment

Figure 1:
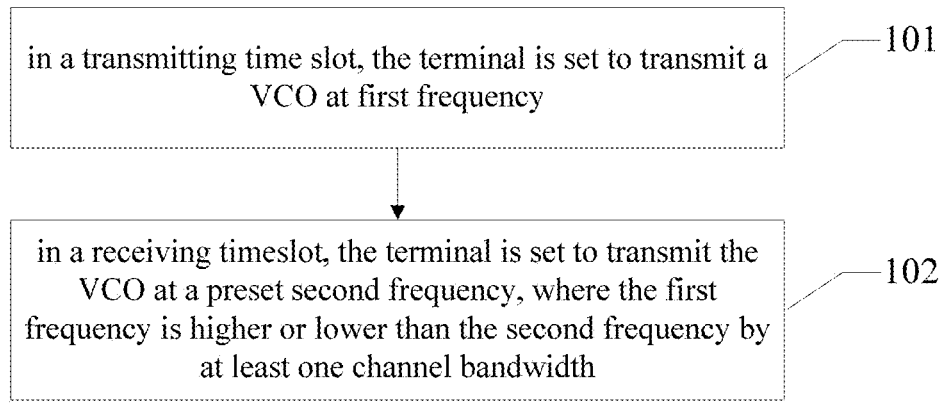
FIG. 1 is a flowchart of a method for improving receiving sensitivity of a terminal according to a first embodiment of the disclosure.

A method for improving receiving sensitivity of a terminal is provided. In the case that the terminal operates in a time division duplex mode, as shown in FIG. 1, the method includes steps 101 to 102.

In step 101, in a transmitting timeslot, a frequency of a transmitting VCO of the terminal is set to be a first frequency.

In step 102, in a receiving timeslot, the frequency of the transmitting VCO of the terminal is set to be a preset second frequency, where the first frequency is higher or lower than the second frequency by at least one channel bandwidth.

According to the embodiment, in the case that the terminal operates in a time division duplex mode, a frequency of a receiving VCO is set to be the first frequency in the receiving timeslot. The transmitting VCO in the terminal is not turned off at this moment, but signal leakage from the transmitting VCO does not influence the receiving sensitivity of the terminal, because the first frequency is higher or lower than the second frequency by at least one channel bandwidth, i.e., a transmitting channel is different from a receiving channel. Thus, the method for improving the receiving sensitivity of the terminal may improve the receiving sensitivity of the terminal.

Further, the method may include keeping a transmitting power amplifier (Power Amplifier, PA) link in an off-state in the receiving timeslot, while the transmitting VCO is kept in operation, so as to save power consumption of the terminal.

It should be noted that, those skilled in the art may preset an appropriate second frequency based on the first frequency and the channel bandwidth, so that the first frequency is higher or lower than the second frequency by at least one channel bandwidth. Preferably, the first frequency may be higher or lower than the second frequency by at least four bandwidths.

Figure 2:
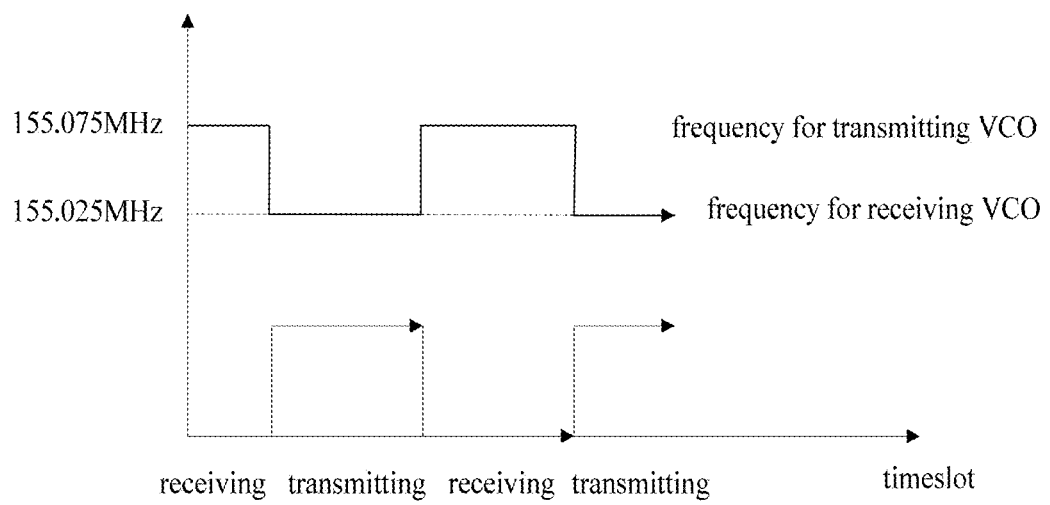
FIG. 2 is a diagram of frequency control according to an embodiment of the disclosure.

For example, as shown in FIG. 2, in the case that a terminal with a specific type operates in the time division duplex mode, the frequency of the receiving VCO is 155.025 MHz, and the frequency of the transmitting VCO is 155.025 MHz in the transmitting timeslot and is 155.075 MHz in the receiving timeslot, i.e., the frequency of the transmitting VCO shifts by 50 KHz (4 channel bandwidths) in the receiving timeslot.

It is found from testing the terminal with the specific type mentioned above that, if the frequency of the transmitting VCO remains 155.025 MHz in the receiving timeslot, the receiving sensitivity is only −60 dB. To ensure that a signal from the transmitting VCO does not influence the receiving sensitivity, isolation between the VCO transmitting channel and a VCO receiving channel is required to be 8 dB+118 dB+10 dB=136 dB (where the 8 dB is co-channel rejection, the 118 dB is the receiving sensitivity, and the 10 dB is output power of a buffer). Such high isolation requires a long distance between the receiving channel and the transmitting channel, and multiple disconnecting switches in the circuit, which cause high cost and a big size for the terminal, and a difficulty to realize on certain platforms. In the case that the frequency of the transmitting VCO is changed to 155.075 MHz in the receiving timeslot, the receiving sensitivity increases to −118 dB, and the isolation is required to be 57 dB+10 dB=67 dB (the 57 dB is timeslot power, and the 10 dB is the output power of the buffer). Such isolation is easy to realize on conventional platforms, and has low requirements for the distance between the receiving channel and the transmitting channel, and the amount of disconnecting switches. Test data mentioned above shows that, the method for improving the receiving sensitivity of the terminal provided in the disclosure may significantly improve the receiving sensitivity of the terminal, reduce the requirement for the isolation of the terminal, save production cost, and reduce the size of the terminal.

A terminal is provided in the disclosure. The terminal supports a time division duplex mode. In the case that the terminal operates in a time division duplex mode, the terminal includes a first frequency control unit and a second frequency control unit.

The first frequency control unit is configured to set a frequency of a transmitting VCO of the terminal to be a first frequency in a transmitting timeslot.

The second frequency control unit is configured to set the frequency of the transmitting VCO of the terminal to be a preset second frequency in a receiving timeslot. The first frequency is higher or lower than the preset second frequency by at least one channel bandwidth.

Further, the terminal includes a third frequency control unit.

The third frequency control unit is configured to set a frequency of a receiving VCO of the terminal to be the first frequency in the receiving timeslot.

It should be noted that, the first frequency control unit, the second frequency control unit or the third frequency control unit may be a processor in the terminal.

According to the embodiment, in the case that the terminal operates in the time division duplex mode, the receiving VCO of the terminal works at the first frequency in the receiving timeslot. The transmitting VCO in the terminal is not turned off at this moment, but signal leakage from the transmitting VCO does not influence the receiving sensitivity of the terminal. That is because the first frequency is higher or lower than the second frequency by at least one channel bandwidth, i.e., a transmitting channel is different from a receiving channel. Thus, the method for improving the receiving sensitivity of the terminal may improve the receiving sensitivity of the terminal.

Further, the terminal includes an operation control unit.

The operation control unit is configured to keep a transmitting power amplifier link in an off-state in the receiving timeslot, while the transmitting VCO is in operation.

It should be noted that, the operation control unit may be a processor in the terminal.

It should be noted that, those skilled in the art may preset an appropriate second frequency based on the first frequency and the channel bandwidth, so that the first frequency is higher or lower than the second frequency by at least one channel bandwidth. Preferably, the first frequency may be higher or lower than the second frequency by at least four bandwidths.

For example, the terminal provided in the disclosure may be a digital two-way radio, such as a hand-held digital two-way radio, a digital vehicular-locating set, or other possible terminals, which is not limited herein.

For example, as shown in FIG. 2, in the case that a terminal with a specific type operates in the time division duplex mode, the frequency control unit 100 controls the frequency of the receiving VCO to be 155.025 MHz, and the frequency of the transmitting VCO to be 155.025 MHz in the transmitting timeslot and 155.075 MHz in the receiving timeslot, i.e., the frequency of the transmitting VCO shifts by 50 KHz (4 channel bandwidths) in the receiving timeslot.

It is found from testing the terminal with the specific type mentioned above that, if the frequency of the transmitting VCO remains is 155.025 MHz in the receiving timeslot, the receiving sensitivity is only −60 dB. To ensure that a signal from the transmitting VCO does not influence the receiving sensitivity, isolation between the VCO transmitting channel and a VCO receiving channel is required to be 8 dB+118 dB+10 dB=136 dB (where the 8 dB is co-channel rejection, the 118 dB is the receiving sensitivity, and the 10 dB is output power of a buffer). Such high isolation requires a long distance between the receiving channel and the transmitting channel, and multiple disconnecting switches in the circuit, which cause high cost and a big size for the terminal, and a difficulty to realize on certain platforms. In the case that the frequency of the transmitting VCO is changed to 155.075 MHz in the receiving timeslot, the receiving sensitivity increases to −118 dB, and the isolation is required to be 57 dB+10 dB=67 dB (the 57 dB is timeslot power, and the 10 dB is the output power of the buffer). Such isolation is easy to realize on conventional platforms, and has low requirements for the distance between the receiving channel and the transmitting channel, and the amount of disconnecting switches. Test data mentioned above shows that, the terminal provided in the disclosure may significantly improve the receiving sensitivity of the terminal, reduce the requirement for the isolation of the terminal, save production cost, and reduce the size of the terminal.

A Third Embodiment

A computer storage media is further provided in the disclosure. The computer storage media may store programs which include, when executed, a part of or all of the steps of the method for improving receiving sensitivity of a terminal described in the first embodiment.

A terminal is further provided in the disclosure. The terminal includes an input device, an output device, storage and a processor. There may be one or more processors, and the input device, the output device, the storage and the processor may be connected through a bus to which the disclosure is not limited herein.

The processor executes the following processes.

In the case that the terminal operates in a time division duplex mode, terminal frequency of a transmitting voltage-controlled oscillator VCO of the terminal is set to be a first frequency in a transmitting timeslot; and
the frequency of the transmitting VCO of the terminal is set to be a preset second frequency in a receiving timeslot, where the first frequency is higher or lower than the preset second frequency by at least one channel bandwidth.

The embodiments mentioned above focus differently from each other, and for a part without details in a specific embodiment, related description in other embodiments may be referred to.

Those skilled in the art may understand that, all of or a part of the steps implementing the above method embodiments may be accomplished through related hardware instructed by programs, and the programs may be stored in a computer readable storage medium. The programs may include the steps of the method embodiments when being executed, and the storage medium includes various mediums which may store programs, such as ROM, RAM, disc, or compact disc.

A method for improving receiving sensitivity of a terminal and a terminal according to the embodiments of the disclosure are described in detail. A principle and implementation of the disclosure are illustrated with specific examples, and the embodiments are only to help understand the method and core concept of the disclosure. For those skilled in the art, modifications may be made to the specific implementations and range of applications. In conclusion, the content of the disclosure should not be understood as limitations to the disclosure.

The invention claimed is:

1. A method for improving receiving sensitivity of a terminal, wherein in the case that the terminal operates in a time division duplex mode, the method comprises:
   setting a frequency of a transmitting voltage-controlled oscillator (VCO) of the terminal to be a first frequency in a transmitting timeslot;
   setting the frequency of the transmitting VCO of the terminal to be a preset second frequency in a receiving timeslot, wherein the first frequency is higher or lower than the preset second frequency by at least one channel bandwidth; and
   setting a frequency of a receiving VCO of the terminal to be the first frequency in the receiving timeslot.

2. The method according to claim 1, further comprising:
   keeping, in the receiving timeslot, the transmitting VCO in operation, and turning off a transmitting power amplifier link.

3. A terminal, comprising a processor and a storage storing program instructions, wherein the terminal supports a time division duplex mode, and in the case that the terminal operates in the time division duplex mode, the processor performs the stored program instructions to:
   set a frequency of a transmitting voltage-controlled oscillator (VCO) of the terminal to be a first frequency in a transmitting timeslot;
   set the frequency of the transmitting VCO of the terminal to be a preset second frequency in a receiving timeslot, wherein the first frequency is higher or lower than the preset second frequency by at least one channel bandwidth; and
   set a frequency of a receiving VCO in the terminal to be the first frequency in the receiving timeslot.

4. The terminal according to claim 3, wherein the processor further performs the stored program instructions to:
   keep, in the receiving timeslot, the transmitting VCO in operation, and turn off a transmitting power amplifier link.

5. The terminal according to claim 3, wherein the terminal is a digital two-way radio.

6. A terminal, comprising an input device, an output device, a storage and a processor,
   wherein the processor executes the following steps:

setting a frequency of a transmitting voltage-controlled oscillator (VCO) of the terminal to be a first frequency in a transmitting timeslot, in the case that the terminal operates in a time division duplex mode;

setting the frequency of the transmitting VCO of the terminal to be a preset second frequency in a receiving timeslot, wherein the first frequency is higher or lower than the preset second frequency by at least one channel bandwidth; and setting a frequency of a receiving VCO of the terminal to be the first frequency in the receiving timeslot.

\* \* \* \* \*